(12) United States Patent
Benkreira et al.

(10) Patent No.: US 11,669,855 B2
(45) Date of Patent: Jun. 6, 2023

(54) SPLIT UP A SINGLE TRANSACTION INTO MANY TRANSACTIONS BASED ON CATEGORY SPEND

(71) Applicant: Capital One Services, LLC, McLean, VA (US)

(72) Inventors: Abdelkader M'Hamed Benkreira, Brooklyn, NY (US); Brendan Way, Brooklyn, NY (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/365,175

(22) Filed: Jul. 1, 2021

(65) Prior Publication Data

US 2023/0005012 A1    Jan. 5, 2023

(51) Int. Cl.
   *G06Q 30/00*       (2023.01)
   *G06Q 30/0238*     (2023.01)
   *G06Q 20/20*       (2012.01)
   *G06Q 20/38*       (2012.01)
   *G06Q 30/0207*     (2023.01)

(52) U.S. Cl.
   CPC ....... *G06Q 30/0238* (2013.01); *G06Q 20/201* (2013.01); *G06Q 20/387* (2013.01); *G06Q 30/0239* (2013.01)

(58) Field of Classification Search
   None
   See application file for complete search history.

(56) References Cited

U.S. PATENT DOCUMENTS

| | | | |
|---|---|---|---|
| 7,672,870 B2 | 3/2010 | Haines et al. | |
| 7,680,708 B1 | 3/2010 | Mooney | |
| 7,810,134 B2 | 10/2010 | Loomis et al. | |
| 8,452,654 B1 | 5/2013 | Wooters et al. | |
| 2003/0046210 A1* | 3/2003 | Vora | G06Q 20/02 705/36 R |
| 2009/0240605 A1 | 9/2009 | Rukonic et al. | |
| 2011/0087592 A1* | 4/2011 | van der Veen | G06Q 20/26 709/204 |

(Continued)

OTHER PUBLICATIONS

Oct. 13, 2022—(WO) International Search Report and Written Opinion—App No. PCT/US2022/035782.

*Primary Examiner* — Kambiz Abdi
*Assistant Examiner* — Christopher Stroud
(74) *Attorney, Agent, or Firm* — Banner & Witcoff, Ltd.

(57) ABSTRACT

Aspects described herein may relate to techniques for segmenting one transaction into multiple sub-transactions. A user may wish to purchase multiple items. The overall purchase request may be segmented into multiple sub-transactions based on a transaction category of each item. Transaction categories may be based on merchant category codes (MCCs). Each sub-transaction may include one or more items related to the same transaction category. Each sub-transaction may be underwritten and approved separately by the merchant and/or a financial institution (e.g., a credit card company). Financial information related to each different transaction category may be determined based on the sub-transactions. Reward offers may be provided in a more robust manner based on the different transaction categories determined during the purchase process.

20 Claims, 5 Drawing Sheets

(56) References Cited

U.S. PATENT DOCUMENTS

| | | | |
|---|---|---|---|
| 2012/0253852 A1* | 10/2012 | Pourfallah | G06Q 20/326 |
| | | | 705/41 |
| 2012/0323663 A1 | 12/2012 | Leach | |
| 2015/0032522 A1* | 1/2015 | Dintenfass | G06Q 30/0226 |
| | | | 705/14.27 |
| 2015/0120418 A1* | 4/2015 | Cervenka | G06Q 20/20 |
| | | | 705/14.23 |
| 2015/0161598 A1 | 6/2015 | Gale et al. | |
| 2015/0186918 A1 | 7/2015 | Clarke | |
| 2016/0189153 A1 | 6/2016 | Luk et al. | |
| 2019/0213623 A1* | 7/2019 | Nagula | G06Q 20/389 |
| 2019/0287117 A1* | 9/2019 | Danyluk | G06Q 30/014 |
| 2021/0012370 A1* | 1/2021 | Zachrisen | G06Q 30/0233 |
| 2021/0217015 A1* | 7/2021 | Williams | G06Q 20/202 |

* cited by examiner

SPLIT UP A SINGLE TRANSACTION INTO MANY TRANSACTIONS BASED ON CATEGORY SPEND

FIELD OF USE

Aspects of the disclosure relate generally to conducting financial transactions. More specifically, aspects of the disclosure provide techniques for modifying data corresponding to a single financial transaction to identify subsets of the data corresponding to different financial transactions associated with different categories of items being purchased.

BACKGROUND

Category spend designations or labels are often associated with financial transactions. For example, a merchant category code (MCC) may be used for a category spend designation in relation to a financial transaction. MCCs may be used to identify a type of business in which a merchant is engaged. As an example, MCC 5532 may be associated with a first merchant that sells tires. Accordingly, when a customer buys tires from the first merchant, the transaction is associated with MCC 5532. As another example, MCC 5411 may be associated with a second, different merchant that sells groceries. Accordingly, when a customer buys groceries from the second merchant, the transaction is associated with MCC 5411.

Conventional financial transaction systems—such as conventional physical point of sale (POS) systems or conventional online POS systems—are limited in that they assign a single MCC category to a transaction (e.g., based on the merchant). A problem arises when a merchant sells items, products, or services than span across multiple MCCs. For example, a merchant may sell both tires and groceries. A financial transaction conducted by a customer with the merchant for the purchase of both tires and groceries will be associated with a single MCC. Despite each purchased item implying a different MCC, conventional financial transaction systems only allow a single MCC to be associated with the transaction. As a result, these conventional financial transaction systems fail to provide accurate financial transaction records that reflect actual category spend information. In turn, accounting records and reward offers based on category spend suffer. Further, the data is limited, and subsequent processing of that data can be limited. For example, because each transaction reflected in data might be limited to a single MCC even though the transaction might relate to purchases of a wide variety of goods and/or services, it might be difficult to analyze that data to identify, for example, purchasing trends across multiple customers, and/or to provide single users detailed analysis regarding their own shopping habits.

Aspects described herein may address these and other problems, and generally enable processing of transaction data in a manner which permits assignment of an MCC for each item purchased, as opposed to assigning an MCC to the overall transaction based on the merchant, thereby improving the fidelity and accuracy of transaction data as well as information regarding items purchased.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may provide techniques for automatically and dynamically segmenting a transaction into multiple different sub-transactions. The transaction may involve a variety of items, products, or services that a customer wishes to purchase or buy. The transaction may be separated into the multiple different sub-transactions based on an MCC associated with each item, product, or service being purchased. That is, a single transaction may occur (or may appear to occur to the customer), but each purchased item, product, or service may be associated with a corresponding MCC, rather than having the single transaction associated with only one MCC. For example, a user might use a credit card to, in the same transaction, purchase a new television and groceries from a big box store. In that example, aspects described herein would separate that transaction into multiple sub-transactions: for instance, one corresponding to the purchase of the new television, and another corresponding to the purchase of the groceries. The sub-transactions may be processed (e.g., underwritten and approved) separately and/or individually. Robust reward offers may be generated based on the separate sub-transactions rather than the overall single transaction, thereby improving customer satisfaction.

For example, some aspects described herein may provide a computer-implemented method for segmenting a single transaction into multiple transactions based on category spend. Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
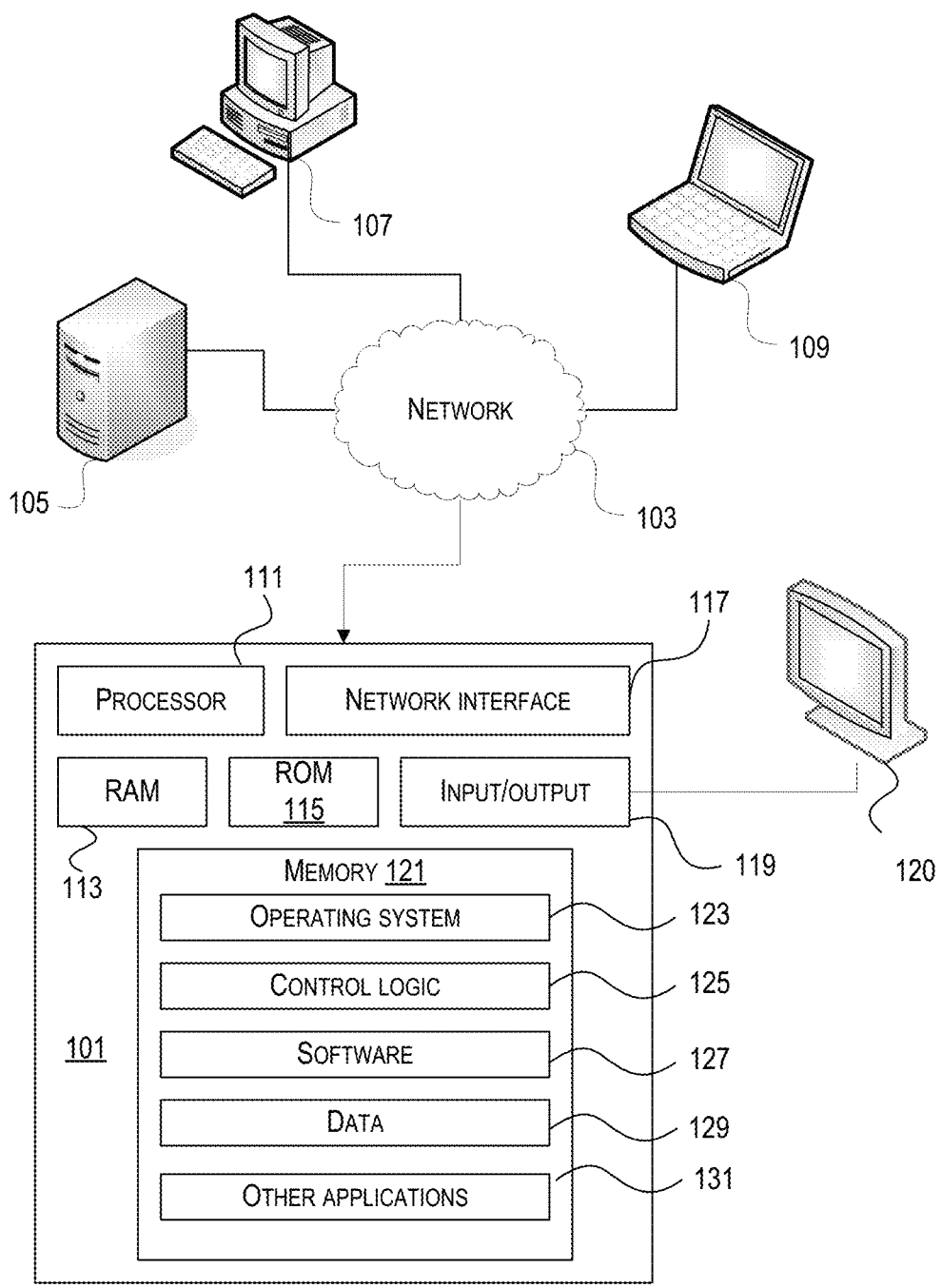
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for segmenting a transaction involving multiple different items into multiple different sub-transactions involving items of a similar category. Multiple items for purchase by a user may be received. The items may be received at a point of sale (POS) system. The POS system may be an in-store POS system or may be a virtual (e.g., online, web-based, and/or app-based) POS system. The identify of each item and the cost or price of each item the user wishes to purchase may be determined. A transaction category for each item being purchased may be determined, with each transaction category including one or more items being purchased by the user. Information indicating the identity of each item, the price of each item, and the transaction category of each item may be stored. A current number of reward points for each transaction category may then be determined. The number of reward points may be based on the cost of each item with a determined corresponding transaction category. A reward offer may then be determined based on the current number of reward points determined for at least one transaction category. The reward offer may then be presented to the user.

Aspects discussed herein may relate to methods and techniques for automatically segmenting a purchase order involving multiple different items into multiple sub-transactions. A user or customer may present a variety of items for purchase at a checkout. The checkout may be an in-person checkout or a virtual checkout. A POS system may scan all of the items for purchase. The POS system may segment the order into multiple sub-transactions based on an MCC corresponding to each item being purchased. In this manner, multiple sub-transactions may be determined, with each sub-transactions involving one or more items, all related to the same MCC. Each sub-transaction may then be separately underwritten and approved. Reward offers may then be generated based on spending categories of the user, as determined by the different MCCs corresponding to the different sub-transactions.

Aspects described herein improve the functioning of computers by improving the way in which computing devices perform financial transactions, store information related to financial transactions, and generate reward offers based on stored financial information. Conventional computing devices implementing conventional techniques for performing these functions do not consider transaction categories for each individual item being purchased, and instead assign a single transaction category to all items being purchased based on the merchant selling the items. As a result, items being purchased may be associated with a transaction category—for example, an MCC of the merchant—that is in no way related to the item being purchased. For example, a user may buy tires, paint, and groceries from a big box store. The big box store may be associated with an MCC of 5411, associated with grocery stores. Accordingly, with conventional computing systems, the purchase of the tires, paint, and groceries will all be associated with MCC 5411, even thought the tires and paint are not considered groceries and better match other MCC categories. As a result, the user may not receive any credit for purchasing the tires or paint in relation to any reward offers that may be provided for the purchase of such items (e.g., provide by either a financial institution or a merchant). Significant time and energy must then be expended by a user to manually separate the overall single transaction involving the tires, paint, and groceries into separate transactions for purposes of attempting to qualify for a reward offer for different categories of spend.

By providing improved techniques for processing financial transactions based on category of spend of the actual items being purchased rather than based on the merchant, financial accounting and category of spend information may be conducted more accurately and efficiently, with improved user or customer satisfaction. Over time, the processes described herein may save processing time, network bandwidth, and other computing resources by having transactions automatically split into multiple different sub-transactions based on category of spending, obviating the need for a user to do so at a later time via intense manual effort. Moreover, such improvement cannot be performed by a human being with the level of accuracy obtainable by computer-implemented techniques that allow financial transactions involving large number of items to be broken down into separate transactions based on actual categories of spend.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may implement one or more aspects of the disclosure by reading and/or executing instructions and performing one or more actions based on the instructions. The computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, local area networks (LANs), wireless networks, personal networks (PAN), and the like. Network 103 is for illustration purposes and may be replaced with fewer or additional computer networks. A LAN may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, software 127, data 129, and other applications 131. Control logic 125 may be incorporated in and may be a part of software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to various examples for segmenting transactions based on category spend.

Figure 2:
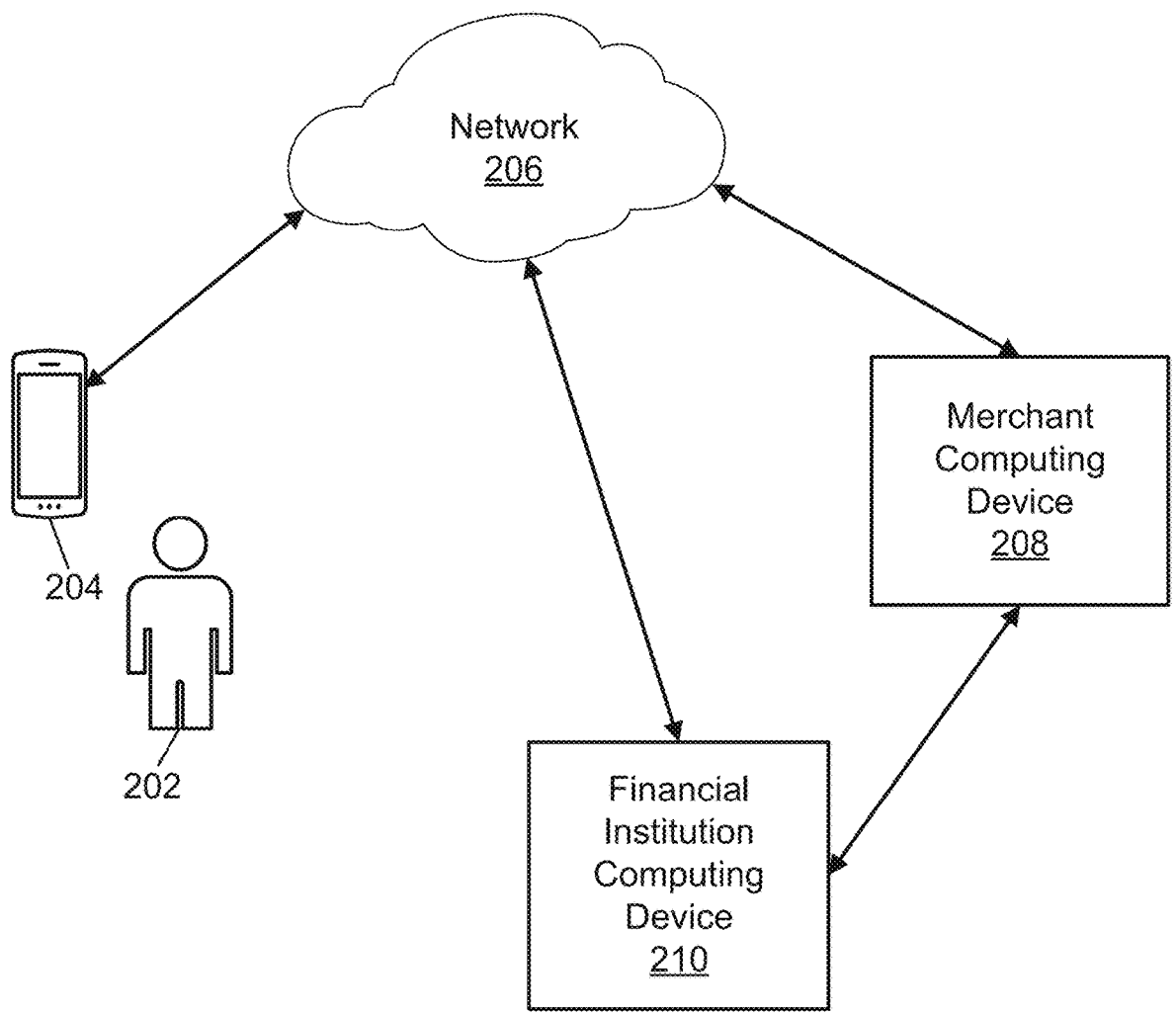
FIG. 2 illustrates a first operating environment for segmenting transactions based on category spend.

FIG. 2 illustrates an operating environment 200 for segmenting a transaction based on category spend. As shown in FIG. 2, the operating environment may include a user 202, a user computing device 204, a network 206, a merchant computing device 208, and a financial institution computing device 210.

The user 202 may be any individual such as a customer. The user computing device 204 may be any type of computing device including any computing device depicted and described in relation to FIG. 1. The user computing device 204 may be, for example, a smartphone, a laptop, or a tablet. The user computing device 204 may be a wireless device such as, for example, a portable wireless computing device.

The user computing device 204 may be associated with the user 202. The user 202 may use the user computing device 204 to conduct financial transactions. For example, the user 202 may use the user computing device 204 to purchase one or more items, products, or services from a merchant. The user 202 may use the user computing device 204 to interact with an online, web-based, and/or app-based transaction system provided by the merchant computing device 208 and/or the financial institution computing device 210. As an example, a merchant may provide an online, web-based, and/or app-based shopping interface (e.g., a virtual shopping interface) using the merchant computing device 208. The user 202 may use the user computing device 204 to select one or more items for purchase from the merchant.

The network 206 may communicatively couple the user computing device 204 with the merchant computing device 208 and the financial institution computing device 210. The network 206 may be any type of communications and/or computer network. The network 206 may include any type of communication mediums and/or may be based on any type of communication standards or protocols. The network 206 may be the same or similar to the network 103 of FIG. 1. The network 206 enables data or other information to be shared among the user computing device 204, the merchant computing device 208, and the financial institution computing device 210.

The user 202 may have one or more financial accounts maintained by a financial intuition associated with the financial institution computing device 210. For example, the user 202 may have a checking account and/or a savings account with a financial intuition associated with the financial institution computing device 210. As another example, the user 202 may have a credit card account maintained by a financial intuition associated with the financial institution computing device 210. The user 202 may use the credit card to purchase one or more items from a merchant using an online shopping interface provided by the merchant computing device 208.

The merchant computing device 208 may be any type of computing device including any computing device depicted and described in relation to FIG. 1. The merchant computing device 208 may be associated with a merchant. The merchant associated with the merchant computing device 208 may be associated with a specific MCC (e.g., a single MCC). However, the merchant associated with the merchant computing device 208 may sell multiple different products, items, and/or services that relate to a wide variety of different MCCs. For example, the merchant associated with the merchant computing device 208 may sell tires and groceries, which are two items associated with different MCCs. The merchant computing device 208 may represent one or more computing devices and/or a computer network associated with the merchant. The merchant computing device 208 may include one or more computers, servers, and/or databases. The merchant associated with the merchant computing device 208 may be any type of merchant that may sell any type of item.

The financial institution computing device 210 may be any type of computing device including any computing device depicted and described in relation to FIG. 1. The financial institution computing device 210 may be associated with a financial institution. For example, the financial institution computing device 210 might be a server associated with a particular financial institution. The financial institution computing device 210 may represent one or more computing devices and/or a computer network associated with the financial institution. The financial institution computing device 210 may include one or more computers, servers, and/or databases.

As stated above, the user 202 associated with the user computing device 204 may have one or more financial accounts with the financial institution associated with the financial institution computing device 210. The user 202 may have a checking account, a savings account, a line of credit, and/or a credit card account provided through the financial institution associated with the financial institution computing device 210. In general, the user 202 associated with the user computing device 204 may have any type of financial account with the financial institution associated with the financial institution computing device 210. The financial institution may be a bank, credit union, credit card company, or any other type of financial institution that may provide one or more financial accounts to an individual.

The financial institution computing device 210 may store information related to various financial accounts maintained by the financial institution associated with the financial institution computing device 210. For example, the financial institution computing device 210 may store data or other information related to various transactions for each financial account maintained by the financial institution. The financial institution computing device 210 may store information related to various financial accounts associated with the user 202 (e.g., data or other information related to various transactions for each financial account associated with the user 202). The transactional data may include any type of transactional data related to a transaction such as, for example, a date, a time, an amount charged, an amount credited (e.g., an amount refunded), and a merchant name for a transaction. The transactional data may also include stock-keeping unit (SKU) data that may include or may be used to determine an item or service related to a particular transaction (e.g., an item or product purchased during a particular transaction). In general, the transactional data may include an indicator for each item purchased by the user 202, a cost of each item, a date and a time when the item was purchased, and a location or merchant where the item was purchased.

According to the techniques described herein, the user 202 may use the user computing device 204 to fill a virtual shopping cart with items to be purchased from a merchant associated with the merchant computing device 208. The items to be purchase may include a set of tires and groceries (e.g., for delivery to the user 202). The merchant computing device 208 may operate as a POS system to facilitate the purchase of the items selected by the user 202. The user 202 may use a credit card to purchase the selected items. The merchant computing device 208 may interact with the financial institution computing device 210 to approve the purchase of the items selected by the user 202.

As described herein, the merchant computing device 208 may identify each item selected by the user 202 for purchase. The items selected by the user 202 for purchase may form or may be considered to form a single transaction by the merchant computing device 208. For example, a user might purchase multiple different items (and/or multiples of the same item) as part of a transaction. The merchant computing device 208 may automatically segment the purchase request of the multiple different items into two or more different categories. For example, the merchant computing device 208 may automatically segment the overall transaction into separate sub-transactions that each include one or more items, with the sub-transactions segmented and separately categorized based on a type of spend. As another example, the sub-transactions may be segmented based on an MCC associated with the one or more items being purchased in each sub-transaction.

As an example of the above, if the user 202 is purchasing tires and groceries, then the merchant computing device 208 may separate the overall transaction into at least two transactions. The first transaction may involve the purchase of the tires, and may be categorized under a first category of spend that relates to a first MCC. The second transaction may involve the purchase of the groceries, and may be categorized under a second category of spend that relates to a second MCC. The merchant computing device 208 may interact with the financial institution computing device 210 to ensure the first and second transactions are separately and individually processed (e.g., underwritten and approved). However, to the user 202, the purchase of the tires and the groceries appears as a single transaction (and may indicated as much on a receipt issued by the merchant computing device 208).

During the process for segmenting the transaction into multiple sub-transactions based on category spend, the merchant computing device 208 may provide indications to the financial institution computing device 210 regarding the different items and associated MCCs purchased by the user 202. For example, the merchant computing device 208 may provide a first indication to the financial institution computing device 210 that a first item (e.g., tires) were purchased by the user 202 and may further indicate that the first item is associated with a first category spend (e.g., a first MCC).

The merchant computing device 208 may further provide a second indication to the financial institution computing device 210 that a second, different item (e.g., groceries) were purchased by the user 202 and may additionally indicate that the second item is associated with a second, different category spend (e.g., a second MCC). The merchant computing device 208 may provide indications of other information related to the transaction such as the merchant involved, the purchase price for each item and the overall transaction, a date of the transaction, and/or a location of the transaction.

The financial institution computing device 210 may use the information provided by the merchant computing device 208 to provide improved financial records regarding the spending habits of the user 202. With conventional financial transaction systems, the financial institution computing device 210 may only be informed that the user 202 made a purchase related to a single MCC (e.g., associated with the merchant and applied to any and all items purchased from the merchant). According to the techniques described herein, the financial institution computing device 210 may receive information indicating an MCC for each item purchased by the user 202 (e.g., such that each MCC may be associated with one or more items). This enables the financial institution computing device 210 to track the spending of the user 202 with more detail.

In turn, the financial institution associated with the financial institution computing device 210 may provide improved reward tracking and offers based on the more accurate category spend information of the user 202. For example, instead of the financial institution computing device 210 lumping the purchase of the tires and the groceries into a single MCC (and, e.g., providing rewards associated with the single MCC, such that, for example, the user might inadvertently be provided grocery purchase-related rewards for a tire purchase), the financial institution computing device 210 may store in association with reward tracking information that the user 202 bought tires under a first MCC and bough groceries under a second MCC. In this manner, the financial institution computing device 210 may store category spend information on an item-by-item level as opposed to having the merchant dictate the MCC associated with the purchase of the two, distinct items. The financial institution associated with the financial institution computing device 210 may then use the detailed category spend information (e.g., including an amount spent on each item with a category of spend) to track and offer rewards to the user 202 based on the purchase habits of the user 202 using the credit card.

Figure 3:
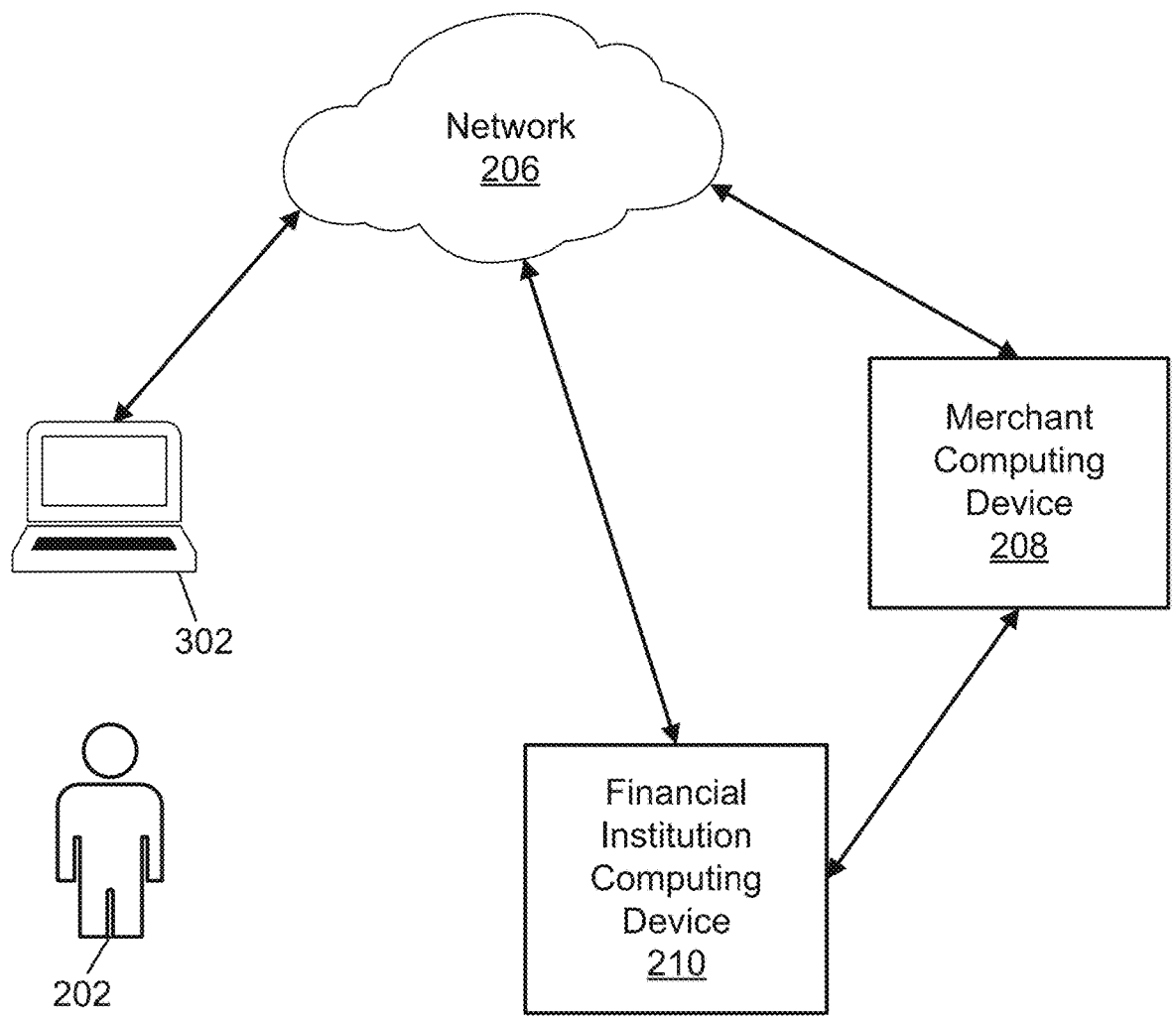
FIG. 3 illustrates a second operating environment for segmenting transactions based on category spend.

FIG. 3 illustrates an operating environment 300 for segmenting a transaction based on category spend. As shown in FIG. 3, the operating environment may include the user 202, a POS terminal 302, the network 206, the merchant computing device 208, and the financial institution computing device 210.

While the operating environment 200 of FIG. 2 illustrates an online, web-based, and/or app-based shopping environment, the operating environment 300 of FIG. 3 illustrates an in-person and/or in-store shopping environment. The POS terminal 302 may operate to scan and or identify items selected for purchase by the user 202 (e.g., items within a shopping cart or basket of the user 202).

The POS terminal 302 may interface with the merchant computing device 208 and/or the financial institution computing device 210 to segment a transaction into multiple transactions as described in relation to FIG. 2. For example, the POS terminal 302 may include a scanner (e.g., a barcode scanner) that may be used to identify each item selected for purchase by the user 202. The POS terminal 302 may provide one or more indications to the merchant computing device 208 to identify each item selected for purchase. The merchant computing device 208 and/or the financial institution computing device 210 may operate separately or in combination to segment the transaction into sub-transactions as described above in relation to FIG. 2. Further, the merchant computing device 208 and/or the financial institution computing device 210 may operate separately or in combination to separately process (e.g., underwrite and approve) each sub-transaction and to generate and store information on the different categories of spend (e.g., different MCCs) for the items being purchased. As described in relation to FIG. 2, this allows the financial institution computing device 210 the ability to provide improve rewards tracking and offers to the user 202 based on the spending habits of the user 202.

Discussion will now turn to an example method for segmenting a transaction into a multiple sub-transactions and offering a reward to a customer based on category spend.

Figure 4:
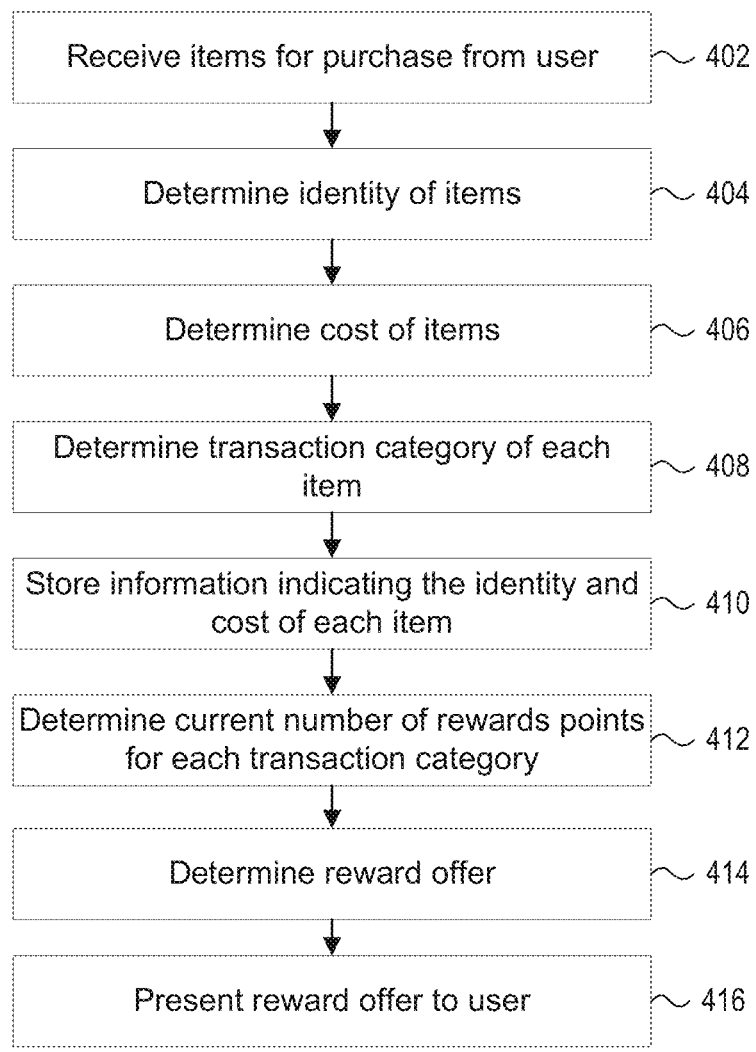
FIG. 4 illustrates an example method for segmenting transactions and offering a corresponding reward offer to a customer based on category spend.

FIG. 4 illustrates an example method 400 for segmenting transactions and offering a corresponding reward to a customer based on category spend. A user or customer may undergo a checkout process with a merchant. The user may have a number of items (e.g., any good or service) to purchase. The user may purchase the items in-person at a physical store or may purchase the items remotely. The user may purchase the items using a computer-based shopping interface such as an online, a web-based, and/or an app-based shopping interface provided by the merchant. The items to purchase may be any type of item and may include any product or service. The merchant may be any type of merchant. A POS system (e.g., any shopping interface provided by the merchant) may scan each item the user wishes to purchase. The POS system may automatically segment the purchase order or request from the user (e.g., the request from the user to purchase the items in the user's actual or virtual shopping cart) into multiple sub-transactions. The overall purchase request may be segmented into multiple sub-transactions based on a category of each item such as, for example, an MCC that corresponds to each item. Each sub-transaction may be underwritten and approved separately by the merchant and/or a financial institution (e.g., a credit card company). To the user, acquiring the items through purchase may appear to be conducted as a single truncation. For example, a receipt to the transaction and/or a transaction record for the financial card of the user may indicate that a single transaction occurred (e.g., as would be indicated on a typical receipt or credit card statement). However, each item may indeed be separately purchased via a separate transaction based on operation of the POS system.

Method 400 may be implemented by a suitable computing system and/or any combination of computing systems or devices, as described herein. For example, method 400 may be implemented in any suitable computing environment by a computing device and/or combination of computing devices, such as computing devices 101, 105, 107, and 109 of FIG. 1 and/or by any one or more of the components depicted in FIG. 2 or FIG. 3 such as, for example, the user device 204, the merchant computing device 208, the financial institution computing device 210, the POS terminal 302, or any combination thereof. Method 400 may be implemented in suitable program instructions, such as in software 127, and may operate on data, such as data 129.

At step 402, an indication of multiple items a user wants to purchase may be received. The indication may be received by a POS system. The POS system may be a physical POS system provided in a physical store of a merchant or may be a virtual POS system provided through an online, web-based, and/or app-based shopping interface by the merchant. As an example, in a physical store of a merchant, the POS system may be used to scan each item the user wants to purchase. Scanning may include reading a barcode or other tag or label associated with each item.

At step 404, an identity of each item the user wants to purchase may be determined. For an in-store, physical POS system, the POS system may include a scanner (e.g., a barcode scanner) that may scan a barcode associated with each item. Information regarding an item (e.g., an identity of the item) may be acquired by scanning the barcode. For a virtual POS system, items that a user includes in the user's shopping cart may be used to identify the items the user wants to purchase.

Identifying each item the user wants to purchase may comprise processing a receipt associated with the transaction. In some instances, step 404 might be performed after a transaction has been completed (e.g., a user has paid for and received items). In such a circumstance, the user might be provided a physical and/or electronic receipt. For example, the user might be sent, via e-mail, a listing of items they purchased. Identifying each item might thereby entail processing an e-mail account associated with the user to identify one or more e-mails associated with a transaction, then processing (e.g., using natural language processing) the e-mail to identify one or more different items associated with the transaction.

Identifying each item the user wants to purchase may comprise receiving, from a POS system, an indication of one or more items to be purchased in a transaction. Some POS systems may be configured to provide indications of one or more items to be purchased via a transaction. For example, a credit card charge request from a POS system might comprise an indication of one or more items associated with a transaction. In such a circumstance, identifying each item might comprise processing data received from the POS system.

At step 406, an indication of a price or cost of each item the user wants to purchase may be determined. For an in-store, physical POS system, the POS system may include a scanner (e.g., a barcode scanner) that may scan a barcode associated with each item. Information regarding an item (e.g., a price of the item) may be acquired by scanning the barcode. For a virtual POS system, items that a user includes in the user's shopping cart may be used to determine a cost of each item the user wants to purchase.

At step 408, a transaction category of each item the user wants to purchase may be determined. The transaction category of each item may be determined based on the determined identity of each item the user wants to purchase. The transaction category may be considered to a be a category of spend. A transaction category of an item may be based on MCCs such that an MCC matching or covering the item is determined. As an example, one of the items the user may want to purchase is a can of paint. At step 408, based on determining the item the user wants to purchase is a can of paint, an MCC of 5231, which is known to cover paint products, may be associated (e.g., by the POS system) with the can of paint.

Determining a transaction category for each item might comprise use of a machine learning model. A machine learning model might be trained, using training data comprising a plurality of items tagged with corresponding MCCs, to identify MCCs based on input items. The trained machine learning might be provided input data comprising identifiers of one or more items, such as those identified in step 406. The trained machine learning model might provide, as output data, an indication of one or more MCCs that correspond to each of the one or more items provided in the input data. In this manner, the trained machine learning model may provide an indication, for input items, of which MCC(s) should be associated with the items. This may advantageously allow the system to determine MCCs for items even where those items are new or otherwise unknown.

At step 410, information indicating the identity of each item the user wants to purchase, information indicating the price or cost of each item the user wants to purchase, and/or the transaction category of each item the user wants to purchase, may be stored. The information may be stored in one or more databases. As an example, the information may be stored by or in association with the merchant computing device 208 and/or the financial institution computing device 210.

At step 412, a financial card being used by the user may be determined. The financial card may be any type of financial card such as, for example, a credit card, a debit card, or a prepaid card. The user may provide the financial card to use to process a transaction involving each of the items the user wants to purchase. A reward program associated with the determined financial card may be determined. Further, a determination may be made as to whether each of the transaction categories determined (e.g., in step 408) are associated with a rewards program. Also, as part of step 412, a current number of reward points for each determined transaction category may be determined (e.g., a number of reward points to be provided or awarded for the current items being purchased). The number of reward points may be based on the price of each item within the same transaction category.

As an example, the user may wish to buy milk, bread, and tires from a merchant. As part of the method 400, it may be determined that the overall transaction involves purchasing the milk, bread, and tires. Further, as part of the method 400, it may be determined that the overall transaction may be segmented into a first sub-transaction—involving the milk and bread—and a second transaction—involving the tires. The first sub-transaction may be determined based on determining that the milk and bread are both items included within the MCC 5411 (e.g., groceries). The second sub-transaction may be determined based on determining that the tires are an item included within the MCC 5532 (e.g., tire products). The first and second sub-transactions may be underwritten and approved separately, for example by the merchant and/or a financial institution associated with the financial card the user may use to purchase the milk, bread, and tires.

Based on the determined first and second sub-transactions, the items included as part of each of the first and second sub-transactions, and/or the determined transaction categories (e.g., the MCCs for each sub-transaction), a reward program for each transaction category may be determined. For example, a first reward program for MCC 5411 may be determined based on the user's desire to purchase milk and bread. A current number of reward points for MCC 5411 associated with the user and the user's financial card may be determined, for example, based on the total cost of the milk and bread. As an example, a prior existing balance of reward points may be 256. A determination may then be made regarding how many reward points are to be provided or awarded based on the purchase of the current items falling under MCC 5411. The current number of reward points may be based on the price of the individual items being purchased under MCC 5411 (and/or the total price of all items under MCC 5411). As an example, the total cost of the milk and bread may be $8.56. Based on the total cost of $8.86, 8 reward points may be granted. A total balance of reward points (e.g., 264) may then be determined based on the prior existing balance (e.g., 256 points) and the current number of points (e.g., 8). In a similar manner, a current number and a total number of reward points may be determined for each determined transaction category involved in the overall transaction.

At step 414, a reward offer for a determined transaction category may be determined. The reward offer may be based on the current number of reward points, the prior balance of reward points, and/or the total number of reward points, for the corresponding transaction category (e.g., MCC). A reward offer may be offered for each determined transaction category associated with the user's transaction or for one or more determined transaction categories. The reward offer may be based on the total number of reward points exceeding a predetermined threshold of points.

At step 416, the reward offer may be provided to the user. The reward offer may be presented to the user in any manner. As an example, the reward offer may be presented electronically on a user device (e.g., the user device 204) associated with the user. The reward offer may include any textual, graphical, and/or pictorial elements. As another example, the reward offer may be presented as a printed coupon or as part of a printed receipt provided to the user. The reward offer may relate to the corresponding transaction category. The reward offer may be provided based on the condition it is used at a particular merchant or when the user uses a particular financial card. A remote computing device—such as the merchant computing device 208 and/or the financial institution computing device 210—may operate to cause the reward offer to be displayed on a display screen of a user device—such as the user computing device 204.

The reward offer may be any type of reward offer. As a first example, determining the reward offer may include determining a discount amount to apply to a future transaction involving the corresponding transaction category (e.g., by the user and using the financial card of the user). As a second example, determining the reward offer may include determining an amount of credit to apply to a future transaction involving the corresponding transaction category (e.g., by the user and using the financial card of the user). As a third example, determining the reward offer may include determining a merchant associated with the transaction being conducted by the user (e.g., a merchant associated with the POS system that the user is interfacing with to purchase the items). The reward offer may further include determining a discount amount or an amount of credit to apply to a future transaction involving the merchant. The reward offer may or may not be applicable to the corresponding transaction category and the reward offer may be associated with the particular user and the particular financial card of the user.

The reward offer might be configured to be automatically applied to future transactions. For example, a reward might be determined for items in a particular MCC. A future transaction might be conducted wherein one or more items in that future transaction are associated with the particular MCC. In response to such a future transaction, a computing device might automatically apply a reward (e.g., a discount) to the items associated with the particular MCC. For example, a reward for grocery shopping might be determined, and that grocery shopping reward might be automatically applied during a future transaction, albeit only to items which are associated with grocery-related MCCs. In this manner, such rewards might be better tailored to purchases of goods and/or services: for example, rewards might be able to be applied on a per-item basis, rather than on a per-transaction basis.

The method 400 allows the identification of different subsets of data based on data associated with a transaction. The data of the transaction may include identification of a variety of items a user wishes to purchase. Subsets of the data may be identified based on a MCC associated with each item being purchased, such that two or more subsets of data may be generated. Each generated subset of data may include data relating to one or more items. Each generated subset of data may include data identifying one or more items and the corresponding price of each item. Each generated subset of data may correspond to a sub-transaction. Each generated subset of data may be processed separately allowing the items associated with each subset to be separately underwritten and approved for purchase using a financial card of a user. A machine learning model may be used to determine the different categories of items being purchased by the user. That is, a machine learning model may receive as an input the items the user wishes to purchase and may associate each items to an appropriate transaction category (e.g., an MCC category or category of pend). The output of the machine learning model may be used to generate each subset of data representing data associated with a sub-transaction.

Figure 5:
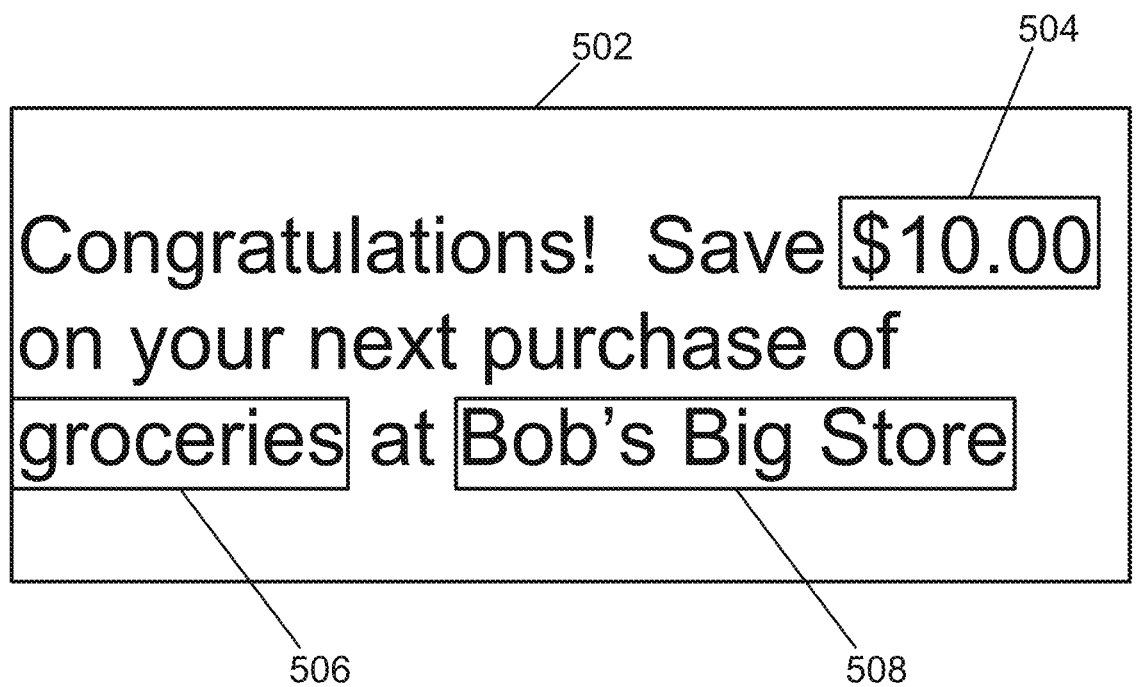
FIG. 5 illustrates an example reward offer presented to a user.

FIG. 5 illustrates an example reward offer 500 that may be presented to a user (e.g., the user 202). The reward offer 500 may be presented in any manner to a user. For example, the reward offer 500 may be presented to the user via a display screen (e.g., a display screen of the user computing device 204) or may be printed and presented to the user on a physical medium.

The reward offer 500 may include a description 502 of the reward. The description 502 may be a narrative. The description 502 may any include any textual or graphical elements. As shown in FIG. 5, the description 502 may identify a discount or credit amount 504 (e.g., a reward offer amount), a transaction category 506, and a merchant identifier 508. In the example shown, the discount or credit amount 504 may be provided as a dollar amount or value. The transaction category 506 may be provided as a description of an MCC. For example, the transaction category 506 may correspond to MCC 5411 but rather than listing "MCC 5411" in the description 502, the reward offer 500 may provide a narrative description of the corresponding MCC. The merchant identifier 508 may be the name of a store or website. The reward offer 500 may be provided based on the user making a recent purchase of groceries that caused a total number of reward points for the category of groceries to exceed a predetermined threshold. The reward offer 500 may be limited to a particular merchant or may apply to any merchant that sells groceries. The reward offer 500 may be limited to being redeemed when the user uses the same financial card to purchase groceries at a particular merchant.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, at a point of sale (POS) system, a plurality of items for purchase by a user;
   scanning, by a barcode scanner of the POS system, a barcode of each item of the plurality of items;
   obtaining, by the POS system and based on the scanning the barcode of each item, information indicating an identity of each item of the plurality of items and information indicating a price of each item of the plurality of items;
   conducting, by the POS system, based on the information indicating the identity of each item of the plurality of items, and based on the information indicating the price of each item of the plurality of items, a transaction for purchase of the plurality of items;
   generating, by the POS system and based on the transaction for the purchase of the plurality of items, a receipt for the transaction for the purchase of the plurality of items, wherein the receipt indicates that the transaction for the purchase of the plurality of items is a singular transaction;
   sending, by the POS system and to an email account of the user, a first email that includes the receipt;
   accessing, by the POS system, the email account of the user;
   identifying, by the POS system and based on accessing the email account of the user, the first email that includes the receipt;
   determining, by the POS system and based on natural language processing of the first email that includes the receipt, the identity of each item of the plurality of items;

training, based on a plurality of training items tagged with corresponding merchant category codes (MCCs), a machine learning model to identify a transaction category for an item;

determining, based on the trained machine learning model and based on the identity of each item of the plurality of items determined based on the natural language processing of the first email that includes the receipt, the transaction category of each item of the plurality of items, wherein the trained machine learning model is configured to identify a transaction category of at least one item of the plurality of items that is a new item and that is not associated with an MCC;

storing, in one or more databases, the identity of each item of the plurality of items determined based on the natural language processing of the first email that includes the receipt and the transaction category of each item of the plurality of items;

conducting, by the POS system and based on determining the transaction category of each item of the plurality of items, a plurality of separate transactions for purchase of the plurality of items, wherein each transaction of the plurality of separate transactions is conducted separately for a corresponding transaction category, and wherein each transaction of the plurality of separate transactions is underwritten and approved separately;

determining a current number of reward points for each transaction category, wherein the reward points are based on the price of each item of the plurality of items within a same transaction category;

determining at least one reward offer based on the current number of reward points determined for at least one transaction category; and based on determining the at least one reward offer, causing the at least one reward offer to be displayed on a display of a user device.

2. The method of claim 1, wherein the plurality of items includes a first item of a first transaction category and a second item of a second transaction category.

3. The method of claim 1, further comprising:
printing, by the POS system and based on the transaction for the purchase of the plurality of items, a physical receipt for the transaction for the purchase of the plurality of items, wherein the physical receipt indicates that the transaction for the purchase of the plurality of items is a singular transaction.

4. The method of claim 1, wherein the POS system comprises an app-based shopping interface.

5. The method of claim 1, further comprising printing the at least one reward offer.

6. The method of claim 1, wherein determining the transaction category of each item of the plurality of items further comprises determining an MCC for each item of the plurality of items.

7. The method of claim 1, wherein determining the at least one reward offer based on the current number of reward points determined for the at least one transaction category further comprises determining a total number of reward points, wherein the total number of rewards points includes a prior balance of reward points for the at least one transaction category.

8. The method of claim 1, wherein determining the at least one reward offer further comprises determining a discount amount to apply to at least one future transaction involving the at least one transaction category.

9. The method of claim 1, wherein determining the at least one reward offer further comprises determining an amount of credit to apply to at least one future transaction involving the at least one transaction category.

10. The method of claim 1, further comprising:
determining an MCC for each item of the plurality of items;
determining a merchant associated with the POS system;
determining a total number of reward points, wherein the total number of rewards points includes a prior balance of reward points for the at least one transaction category; and
determining the total number of reward points exceeds a predetermined threshold, wherein the reward offer comprises an indicator of the at least one transaction category, an indicator of a reward amount, and an indicator of the merchant.

11. An apparatus comprising:
one or more processors; and
memory storing instructions that, when executed by the one or more processors, cause the apparatus to:
receive, at a point of sale (POS) system, a plurality of items for purchase by a user;
scan, by a barcode scanner of the POS system, a barcode of each item of the plurality of items;
obtain, by the POS system and based on the scanning the barcode of each item, information indicating an identity of each item of the plurality of items and information indicating a price of each item of the plurality of items;
conduct, by the POS system, based on the information indicating the identity of each item of the plurality of items, and based on the information indicating the price of each item of the plurality of items, a transaction for purchase of the plurality of items;
generate, by the POS system and based on the transaction for the purchase of the plurality of items, a receipt for the transaction for the purchase of the plurality of items, wherein the receipt indicates that the transaction for the purchase of the plurality of items is a singular transaction;
send, by the POS system and to an email account of the user, a first email that includes the receipt;
access, by the POS system, the email account of the user;
identify, by the POS system and based on accessing the email account of the user, the first email that includes the receipt;
determine, by the POS system and based on natural language processing of the first email that includes the receipt, the identity of each item of the plurality of items;
train, based on a plurality of training items tagged with corresponding merchant category codes (MCCs), a machine learning model to identify a transaction category for an item;
determine, based on the trained machine learning model and based on the identity of each item of the plurality of items determined based on the natural language processing of the first email that includes the receipt, a transaction category of each item of the plurality of items, wherein the trained machine learning model is configured to identify a transaction category of at least one item of the plurality of items that is a new item and that is not associated with an MCC;
store, in one or more databases, the identity of each item of the plurality of items determined based on the natural language processing of the email that includes the receipt and the transaction category of each item of the plurality of items;

conduct, by the POS system and based on determining the transaction category of each item of the plurality of items, a plurality of separate transactions for purchase of the plurality of items, wherein each transaction of the plurality of separate transactions is conducted separately for a corresponding transaction category, and wherein each transaction of the plurality of separate transactions is underwritten and approved separately;

determine a current number of reward points for each transaction category, wherein the current number of reward points is based on the price of each item of the plurality of items within a same transaction category;

determine at least one reward offer based on the current number of reward points determined for at least one transaction category; and based on determining the at least one reward offer, cause the at least one reward offer to be displayed on a display of a user device.

12. The apparatus of claim 11, wherein the plurality of items includes a first item of a first transaction category and a second item of a second transaction category.

13. The apparatus of claim 11, wherein the at least one reward offer comprises a narrative description of the reward.

14. The apparatus of claim 11, the memory storing instructions that, when executed by the one or more processors, cause the apparatus to provide an app-based shopping interface.

15. The apparatus of claim 11, the memory storing instructions that, when executed by the one or more processors, cause the apparatus to print the at least one reward offer.

16. The apparatus of claim 11, the memory storing instructions that, when executed by the one or more processors, cause the apparatus to determine the transaction category of each item of the plurality of items by determining an MCC for each item of the plurality of items.

17. The apparatus of claim 11, the memory storing instructions that, when executed by the one or more processors, cause the apparatus to determine the at least one reward offer based on the current number of reward points determined for the at least one transaction category by determining a total number of reward points, wherein the total number of rewards points includes a prior balance of reward points for the at least one transaction category and the current number of reward points determined for the at least one transaction category.

18. The apparatus of claim 11, the memory storing instructions that, when executed by the one or more processors, cause the apparatus to determine the at least one reward offer by determining a discount amount to apply to at least one future transaction involving the at least one transaction category.

19. The apparatus of claim 11, the memory storing instructions that, when executed by the one or more processors, cause the apparatus to determine the at least one reward offer by determining an amount of credit to apply to at least one future transaction involving the at least one transaction category.

20. One or more non-transitory media storing instructions that, when executed by one or more processors, cause the one or more processors to perform steps comprising:

receive, at a point of sale (POS) system, a plurality of items for purchase by a user;

scan, by a barcode scanner of the POS system, a barcode of each item of the plurality of items;

obtain, by the POS system and based on the scanning the barcode of each item, information indicating an identity of each item of the plurality of items and information indicating a price of each item of the plurality of items;

conduct, by the POS system, based on the information indicating the identity of each item of the plurality of items, and based on the information indicating the price of each item of the plurality of items, a transaction for purchase of the plurality of items;

generate, by the POS system and based on the transaction for the purchase of the plurality of items, a receipt for the transaction for the purchase of the plurality of items, wherein the receipt indicates that the transaction for the purchase of the plurality of items is a singular transaction;

send, by the POS system and to an email account of the user, a first email that includes the receipt;

access, by the POS system, the email account of the user;

identify, by the POS system and based on accessing the email account of the user, the first email that includes the receipt;

determine, by the POS system and based on natural language processing of the first email that includes the receipt, the identity of each item of the plurality of items;

train, based on a plurality of training items tagged with corresponding merchant category codes (MCCs), a machine learning model to identify a transaction category for an item;

determine, based on the trained machine learning model and based on the identity of each item of the plurality of items determined based on the natural language processing of the first email that includes the receipt, a transaction category of each item of the plurality of items, wherein the trained machine learning model is configured to identify a transaction category of at least one item of the plurality of items that is a new item and that is not associated with an MCC;

store, in one or more databases, the identity of each item of the plurality of items determined based on the natural language processing of the email that includes the receipt and the transaction category of each item of the plurality of items;

conduct, by the POS system and based on determining the transaction category of each item of the plurality of items, a plurality of separate transactions for purchase of the plurality of items, wherein each transaction of the plurality of separate transactions is conducted separately for a corresponding transaction category, and wherein each transaction of the plurality of separate transactions is underwritten and approved separately;

determine a current number of reward points for each transaction category, wherein the current number of reward points is based on the price of each item of the plurality of items within a same transaction category;

determine at least one reward offer based on the current number of reward points determined for at least one transaction category; and based on determining the at least one reward offer, cause the at least one reward offer to be displayed on a display of a user device.

* * * * *